(12) United States Patent
Hymel

(10) Patent No.: US 6,788,929 B2
(45) Date of Patent: Sep. 7, 2004

(54) EMAIL MESSAGE CONFIRMATION BY AUDIO EMAIL TAGS

(75) Inventor: James Hymel, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/144,915

(22) Filed: May 14, 2002

(65) Prior Publication Data

US 2003/0216137 A1 Nov. 20, 2003

(51) Int. Cl.[7] .............................................. H04M 11/10
(52) U.S. Cl. ............................... 455/412.2; 455/412.1; 455/413; 379/88.12; 379/88.13; 709/206; 709/207; 709/233
(58) Field of Search ......................... 755/412.1, 412.2, 755/550.1, 413; 379/88.12, 88.13, 88.14; 709/233, 206, 207

(56) References Cited

U.S. PATENT DOCUMENTS

| | | | | |
|---|---|---|---|---|
| 6,023,779 | A | | 2/2000 | Fullam et al. ............... 714/751 |
| 6,233,318 | B1 | * | 5/2001 | Picard et al. ............. 379/88.17 |
| 6,341,160 | B2 | * | 1/2002 | Tverskoy et al. ........ 379/88.13 |
| 6,463,134 | B1 | * | 10/2002 | Okada et al. ............ 379/93.24 |
| 6,532,230 | B1 | * | 3/2003 | Lung et al. .................. 370/352 |
| 6,556,817 | B1 | * | 4/2003 | Souissi et al. .............. 455/406 |

* cited by examiner

Primary Examiner—Charles Appiah
Assistant Examiner—Nghi H. Ly
(74) Attorney, Agent, or Firm—Posz & Bethards, PLC; Charles W. Bethards

(57) ABSTRACT

A mobile device (10) includes a client agent (16) for sending and receiving electronic mail messages via an internet connection, for permitting a user to set the predetermined status for a particular email message and for monitoring a status of each of the electronic mail messages. The mobile device (10) also includes a microphone (18) for recording an audio message, a digital signal processing device (22) for converting the audio message from an analog format to a digital format and for storing the audio message in a local memory (20) with the identification tag and a speaker 24 for playing the audio message. The client agent (16) creates an identification tag, and associates it with a particular electronic mail message by appending the identification tag to the particular electronic mail message and determines that the particular electronic mail message has achieved the predetermined status by recognizing an acknowledgment signal sent from a remote server. The client agent (16) plays the audio message if it determines that the particular electronic mail message has achieved the predetermined status set by the user.

19 Claims, 3 Drawing Sheets

US 6,788,929 B2

EMAIL MESSAGE CONFIRMATION BY AUDIO EMAIL TAGS

FIELD OF THE INVENTION

The present invention relates generally to mobile devices, and more particularly to a mobile device that can generate an audio identification tag for an electronic mail message.

DESCRIPTION OF THE RELATED ART

Mobile devices that are enabled for internet access or other access technologies and methodologies can send and receive electronic mail messages. Typically, a user keys in a text message and electronic mail software programmed on the mobile device transmits the message via a switching connection to a server. However, a user of such a mobile device cannot confirm that the intended recipient successfully received the electronic mail message until and unless the user receives a reply message. Also, while the user may be comfortable using their mobile device for voice messages, the user may not be comfortable using his or her mobile device for text message purposes.

Therefore, what is needed is a mobile device that provides a user with confirmation that an electronic mail message has been received or that the electronic mail message has achieved a monitoring status set by the user to provide the user with a certain degree of comfort in using the mobile device for text message purposes.

BRIEF DESCRIPTION OF THE DRAWINGS

Objects and advantages of the present invention will be more readily apparent from the following detailed description of preferred embodiments thereof when taken together with the accompanying drawings in which.

BRIEF DESCRIPTION OF THE PREFERRED EMBODIMENTS

In overview form the present disclosure concerns a mobile device with the capability to access the internet. As further discussed below, various inventive principles and combinations thereof are advantageously employed to create an audio electronic mail identification tag that is associated with an electronic email message and that is played to the user of the mobile device when a predetermined condition is satisfied.

The instant disclosure is provided to further explain in an enabling fashion the best modes of performing the embodiments of the present invention. The disclosure is further offered to enhance an understanding and appreciation for the inventive principles and advantages thereof, rather than to limit in any manner the invention, The invention is defined solely by the appended claims including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

Figure 1:
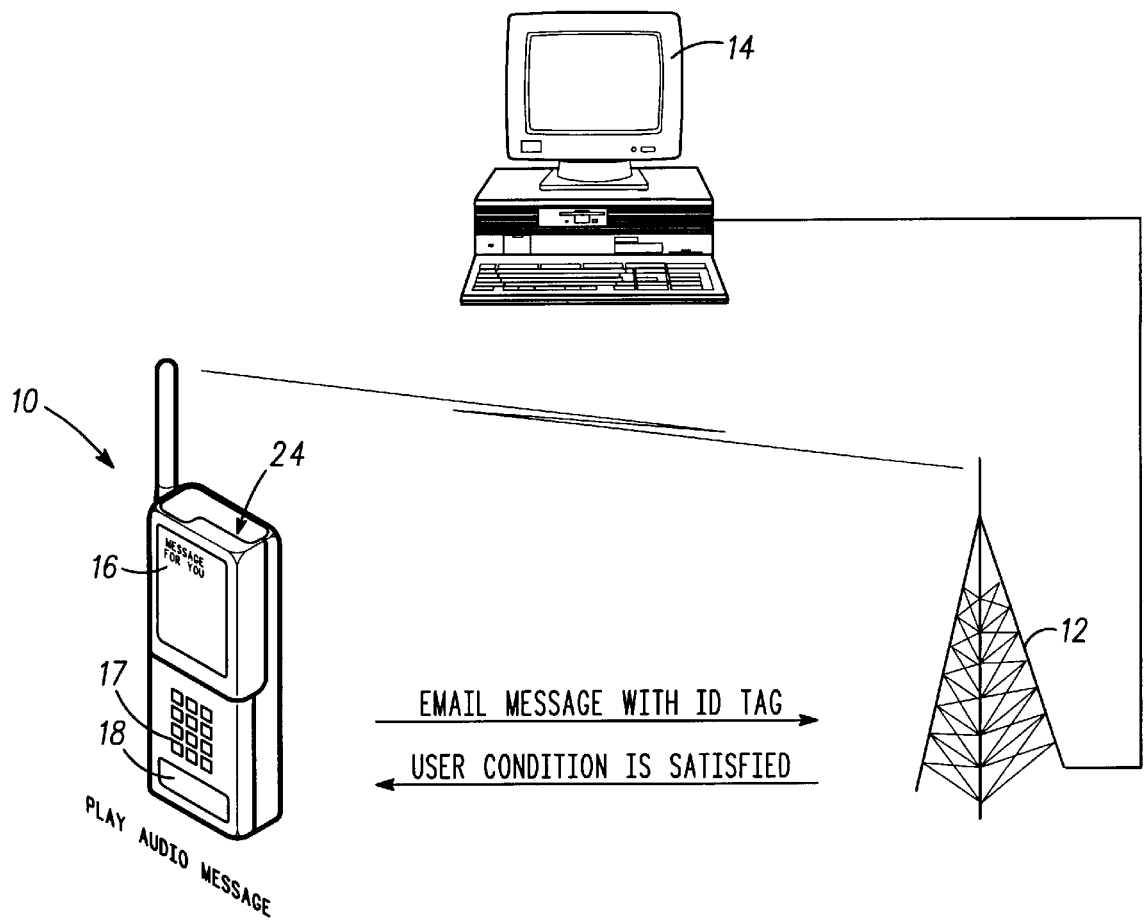
FIG. 1 is an exemplary system environment within which a mobile device according to the present invention may be implemented.

Referring now to the drawings in which like numerals reference like items, FIG. 1 shows an exemplary system environment in which a mobile device 10 according to the present invention is implemented or utilized. The environment includes the mobile device 10, such as a mobile phone or messaging device or the like, an internet connection server (server) 14, such as a server or host that an Internet Service Provider may utilize to provide the mobile device 10 with the capability of establishing an internet connection via, for example, the radio access network 12 (depicted representatively as an antenna on a tower) to the server 14 and thus public switched data or telephone network. This internet connection can be accomplished using, for example Wireless Access Protocols (WAP) for the over the air pathway and conventional IP (Internet Protocol) procedures for the conventional pathways. The mobile device 10 includes among other entities not shown such as a transceiver and the like, a client agent 16, a microphone 18, a local memory 20, a digital signal processing device 22, a speaker 24 and a clock 26 all inter coupled and operating as depicted, each of which will be discussed in detail below with reference to FIG. 2.

The client agent 16 is a software program loaded onto the local memory 20 for creating, sending and receiving electronic mail (email) messages, for creating audio identification tags and associating the audio identification tags with a particular email message and for setting and monitoring for a predetermined status. As will be understood by those skilled in the art, the client agent 16 sends and receives email messages via an internet connection with a server 14 and can either be loaded onto the mobile device 10 as a software program or hardwired into the mobile device 10 via, for example, a combination of semi custom integrated circuits and ROM memory. An audio identification tag is a label that identifies where an audio message is located in the local memory 20. The client agent 16 creates the audio identification tags when the user records an audio message. The client agent 16 associates the audio identification tag with a particular email message by appending the audio identification tag to the email message before it is sent.

The microphone 18 is for among other functions, permitting the user to record audio messages. While it is contemplated that a microphone 18 is used for the recording, any suitable device for recording an audio message may be used in place of the microphone 18.

The local memory 20, which may be, for example, a device random access memory, is for storing the audio message, electronic mail messages and other mobile device specific parameters.

The digital signal processing device 22 is for executing the commands of the client agent 16, for converting the audio message from an analog format to a digital format, for storing the audio message in the local memory 20 and for communicating the location of the audio message to the client agent 16. The digital signal processing device 22 may be, for example, a digital signal processor microchip and is provided with a signal from a clock 26 that allows various times to be assessed.

The speaker 24 is for playing audio messages to the user and for performing other mobile device specific user interface tasks.

Figure 2:
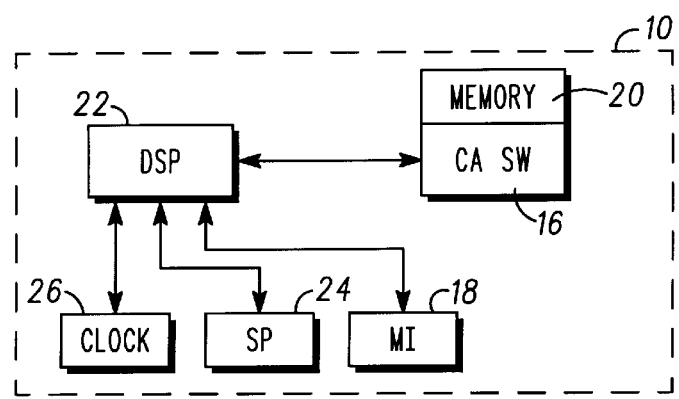
FIG. 2 shows a block diagram of the mobile device of FIG. 1.
Figure 3:
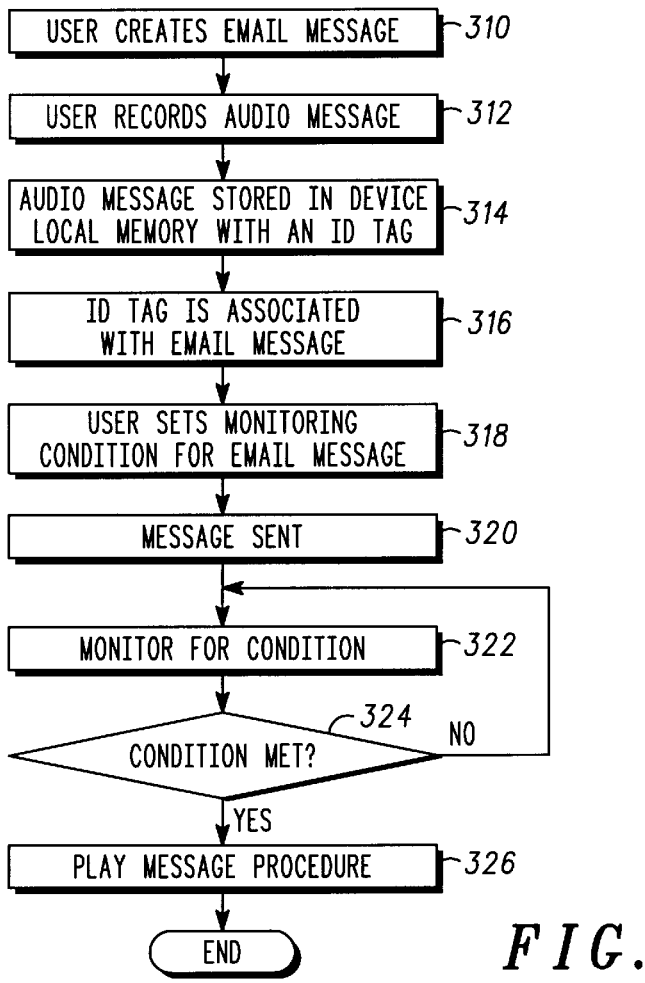
FIG. 3 is a flow diagram of a preferred method embodiment, suitable for use by the FIG. 2 mobile device, of generating an audio identification tag and playing an audio message according to the present invention.

Referring to FIG. 3, a flow diagram, suitable for use by the FIG. 2 mobile device, of a preferred method embodiment of generating an audio identification tag and playing an audio message will now be discussed and described. Initially, at 310 the user keys an email message using keys on the mobile device 10, such as a mobile phone. The email message is created within a text editor of the client agent 16. After creating the email message, the client agent 16 forwards the email message to an outbox, which is a location in the local memory 20 designated by the client agent 16. At 312, after the email message has been created and subsequently placed in the outbox, the client agent 16 prompts the user to record an audio message. The user records the audio message by speaking into the microphone 18. The audio message can be, for example, the title of the email message and to whom it is being sent. At 314, the client agent 16 generates an audio email identification tag (audio email tag) for the email message and commands the digital signal processing device 22 to store the audio message and audio email tag in the local memory 20. At 316, the client agent 16 associates the audio email tag with the email message in the outbox by appending it to the email message.

At 318, the user sets a predetermined confirmation status (or predetermined monitoring status) for the email message via the client agent 16 by keying in or selecting on a device keypad 17 in response, for example to a display prompt one or more such status parameters. The monitoring status can be, for example, a time duration, electronic mail message manipulated, electronic mail message received, or electronic message forwarded or replied to. Time duration is selected as a monitoring status if the user would like, for example to be notified if the intended recipient has received etc the email message after a certain time period has elapsed or perhaps when the email message has not been received. An electronic mail message manipulated status condition is selected as a monitoring status if the user would like to be notified when the intended recipient has actually read the email message. Electronic mail message received status condition is selected if the user would like to be notified when the intended party has received the email message. Electronic mail message replied to status condition is selected if the user would like to be notified when the intended party has replied to or forwarded the email message. The above-mentioned selections could be made for any number of reasons that may be different than those disclosed. Also, the client agent 16 could be modified to include other monitoring status selections. Furthermore more than one of these status conditions can be used in combination and in the end the user will be the judge of what scheme is most beneficial for their own purposes.

At 320, the email message is sent to an intended recipient via the server 14. As will be understood by those skilled in the art, the client agent 16 sends the email message from the mobile device 10 via an established internet connection or session to the server 14 according to a specific protocol. An example of such a protocol is Post Office Protocol.

At 322–324 the client agent 16 determines whether the email message has satisfied one of the selected predetermined monitoring status conditions or combination thereof as described above. If the selected monitoring status condition is satisfied, at 326, the mobile device plays the audio message to the user via the speaker 24. If the selected monitoring status condition is not satisfied, the client agent 16 continues to monitor.

Figure 4:
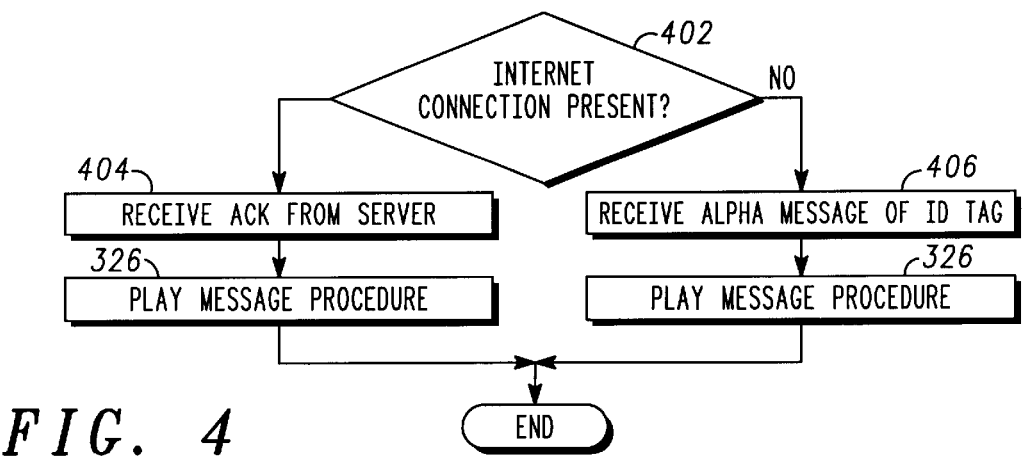
FIG. 4 is a flow diagram of a method, suitable for use by the FIG. 2 mobile device, for determining whether an electronic mail message has satisfied predetermined conditions according to the present invention.

The general methodology by which the client agent 16 determines whether the predetermined monitoring status has been satisfied is described more specifically with reference to FIG. 4. FIG. 4 is a flow diagram of a method, suitable for use by the FIG. 2 mobile device, for determining whether an electronic mail message has satisfied predetermined conditions. At 402, after the server 14 has successfully sent the message, the server 14 determines if the user's mobile device 10 is connected or attached to the internet (is online). If the mobile device 10 is online, at 404 the client agent 16 receives an acknowledgement signal from the server 14 via the online connection. If the mobile device 10 is not online or attached to the internet, at 406 the mobile device 10 receives an alpha message, such as a short message via known short message services procedures indicative of the audio identification tag from the server 14. At 404 and 406 the mobile device recognizes either the acknowledgement signal or the alpha message and plays the audio message at 326 as discussed above.

Figure 5:
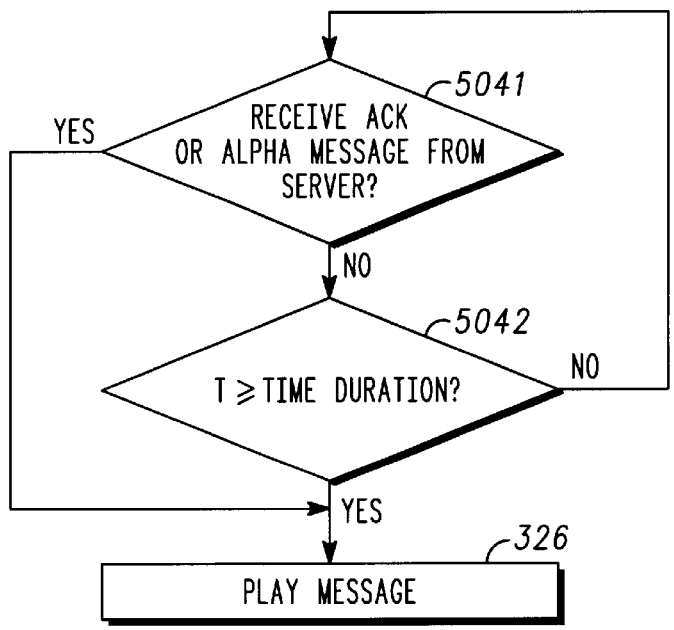
FIG. 5 is a flow diagram of a method, suitable for use by the FIG. 2 mobile device, for determining whether an electronic mail message has satisfied a time duration condition according to the present invention.

The specific methodology by which the client agent 16 determines whether the email message has satisfied a time duration as set by the user at 318 in FIG. 3 is described more specifically with reference to FIG. 5. FIG. 5 is a flow diagram of a method, suitable for use by the FIG. 2 mobile device, for determining whether an electronic mail message has satisfied a time duration condition. At 5041, the client agent 16 monitors to see if an acknowledgement signal or an alpha message has been received from the server 14. If such a signal or message has been received, the audio message is played at 326 as shown in FIG. 3. If the acknowledgement signal or alpha message has not been received, at 5042 the client agent utilizes a timer such as, for example, an internal clock 26 of the mobile device 10 to determine if the specified time duration has passed. If the specified time duration has passed, the audio message is played at 326 as shown in FIG. 3. If the specified time duration has not passed, the client agent 16 returns to 4041.

Figure 6:
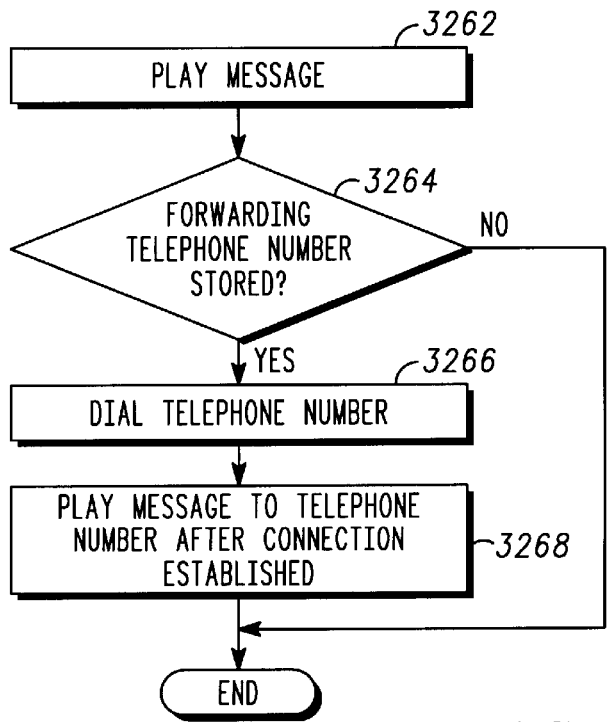
FIG. 6 is a more detailed flow diagram of a method embodiment for playing an audio message according to the present invention.

Referring now to FIG. 6, a modification to the process for playing the audio message at 326 in FIG. 3 is described. FIG. 6 is a more detailed flow diagram of a method embodiment for playing an audio message. In this modification the user stores a forwarding telephone number in the local memory 20 and activates a call forwarding option. At 3262 the message is played to the user via the speaker 24. At 3264 the client agent 16 determines if a forwarding telephone number is stored in the local memory 20. If such a forwarding telephone number is found, at 3266 the client agent 16 commands the mobile device 10 to dial the forwarding telephone number. After a connection is established between the forwarding telephone number and the mobile device 10, at 3268 the client agent 16 commands the mobile device 10 to play the audio message on the established connection. As will be understood by those skilled in the art, the client agent 16 determines when a connection is established between the forwarding telephone number and the mobile device 10 by utilizing the protocol signals of the switching network. If there is no forwarding telephone number stored in the local memory 20, the process ends.

In view of the foregoing, it is contemplated that the present invention is not limited to mobile devices. The methodology of the present invention could be applied to any device having the capability of establishing an internet connection.

Therefore, generally speaking, the present invention provides a mobile device that includes a client agent for sending and receiving electronic mail messages via an internet connection and for monitoring a status of each of the electronic mail messages, a recording means for recording an audio message and a digital signal processing device for converting the audio message from an analog format to a digital format and for storing the audio message in a local memory with an identification tag. The client agent associates the identification tag with a particular electronic mail message by appending the identification tag to the particular electronic mail message. The audio message is played if the client agent determines that the particular electronic mail message has achieved a predetermined confirmation status that is set by the user by recognizing an acknowledgment signal or alpha message sent from a remote server. In an optional modification, the client agent permits the user to set a forwarding telephone number and forward the audio message to the telephone number if the client agent determines that the particular electronic mail message has achieved the predetermined monitoring status.

The present invention accustoms users of mobile devices to using their mobile device for text message purposes by providing confirmation that the intended recipient has successfully received text messages sent by the user.

While the above description is of the preferred embodiment of the present invention, it should be appreciated that the invention may be modified, altered, or varied without deviating from the scope and fair meaning of the claims. For example, the client agent 16 could present the user with an option to record an audio message. Also, the audio message could be recorded during a different point in the process.

What is claimed is:

1. A mobile device comprising:
   a client agent for sending and receiving electronic mail messages via an internet connection and for monitoring a status of each of the electronic mail messages; and
   a microphone for recording an audio message;
   wherein the client agent associates the audio message with a particular electronic mail message that has been sent;
   wherein the audio message is played when the client agent determines that the particular electronic mail message has achieved a predetermined monitoring status.

2. The mobile device of claim 1, further comprising a digital signal processing device for converting the audio message from an analog format to a digital format and for storing the audio message in a local memory with an identification tag.

3. The mobile device of claim 2, wherein the client agent is for associating the identification tag with the particular electronic mail message by appending the identification tag to the particular electronic mail message.

4. The mobile device of claim 1, wherein the client agent is further for permitting a user to set the predetermined monitoring status for the particular electronic mail message.

5. The mobile device of claim 4, wherein the predetermined status is one of a time duration, electronic mail message manipulated, electronic mail message received, and a electronic message replied to status.

6. The mobile device of claim 1, wherein the client agent is for determining that the particular electronic mail message has achieved the predetermined status by recognizing an acknowledgment signal sent from a remote server.

7. The mobile device of claim 1, wherein the client agent is further for setting a forwarding telephone number and for commanding forwarding of the audio message to the telephone number if the client agent determines that the particular electronic mail message has achieved the predetermined monitoring status.

8. The mobile device of claim 1, wherein the client agent commands playing of the audio message if the client agent determines that the particular electronic mail message has achieved the predetermined monitoring status.

9. The mobile device of claim 1, wherein the client agent determines that the particular electronic mail message has achieved the predetermined status by recognizing an alpha message sent from a remote server.

10. A method for providing an audio electronic mail confirmation comprising:
    setting a confirmation status for the audio electronic mail confirmation;
    recording an audio message in a memory;
    associating the audio message with a particular electronic mail message that has been sent by appending an identification tag that identifies the audio message to the particular electronic mail message;
    determining when the particular electronic mail message has obtained the confirmation status; and
    playing the audio message when the particular electronic mail message has obtained the confirmation status.

11. The method of claim 10, wherein the setting a confirmation status for the audio electronic mail confirmation further comprises setting one of a time duration, an electronic message manipulated, an electronic message received and an electronic message replied to status.

12. The method of claim 10, wherein the determining if the particular electronic mail message has obtained the confirmation status further comprises recognizing an acknowledgment signal from a remote server.

13. The method of claim 10, wherein the determining if the particular electronic mail message has obtained the confirmation status further comprises recognizing an alpha message from a remote server.

14. A client agent for a mobile device comprising:
    means for commanding sending and receiving of electronic mail messages via an internet connection;
    means for associating an audio message with a particular electronic mail message;
    means for setting a predetermined monitoring status for the particular electronic mail message;
    means for determining a status of the particular electronic mail after the particular electronic mail message has been sent; and
    means for commanding playing of the audio message if the means for determining a status of the particular electronic message determines that the predetermined monitoring status has been obtained.

15. The client agent of claim 14, wherein the means for determining a status of the particular electronic mail message determines the status of the particular electronic mail message by recognizing an acknowledgment signal from a remote server.

16. The client agent of claim 15, wherein the predetermined status is selected from a group consisting of a time duration, electronic message received and an electronic message replied to status.

17. The client agent of claim 16, wherein the means for associating an audio message with a particular electronic mail message appends an identification tag to the particular electronic mail message.

18. The client agent of claim 17, further comprising means for setting a forwarding telephone number, and wherein the means for commanding playing of the audio message further comprises commanding forwarding of the audio message to the forwarding telephone number.

19. The client agent of claim 14, wherein the means for determining a status of the particular electronic mail message determines the status of the particular electronic mail message by recognizing an alpha message from a remote server.

* * * * *